May 5, 1953 W. B. ASHWORTH 2,637,366
SPIRAL DRIVE
Filed July 29, 1947 5 Sheets-Sheet 1

Walder B. Ashworth,
*INVENTOR.*

May 5, 1953 W. B. ASHWORTH 2,637,366
SPIRAL DRIVE
Filed July 29, 1947 5 Sheets-Sheet 2
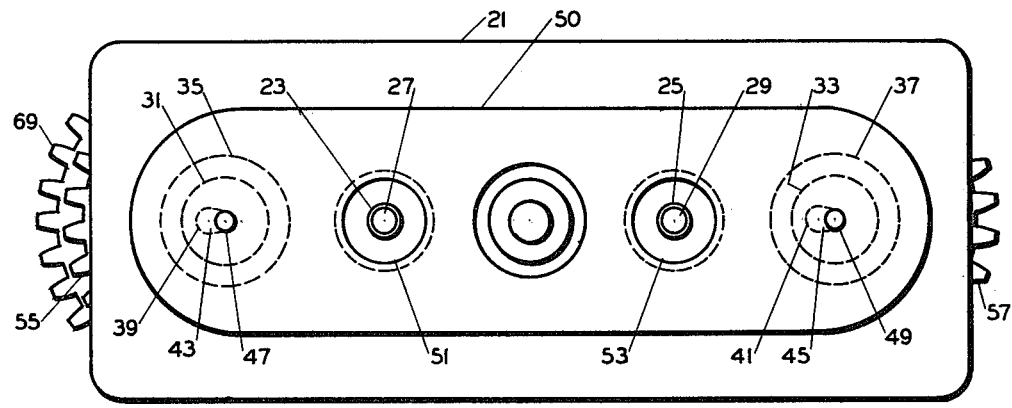
Fig. 2
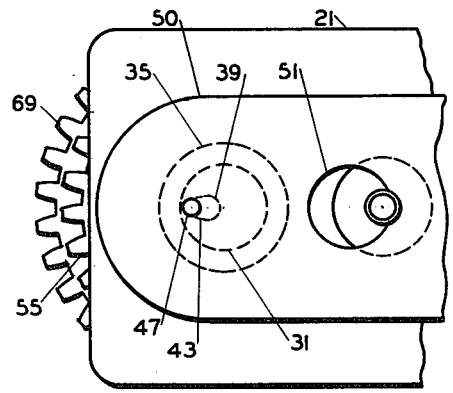
Fig. 4
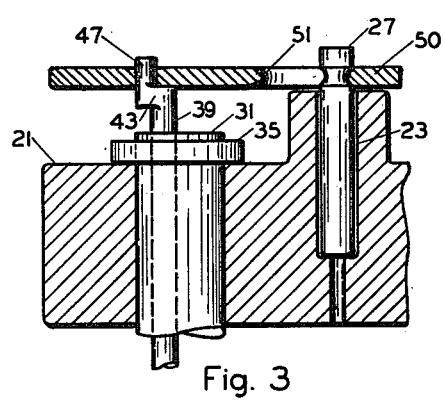
Fig. 3
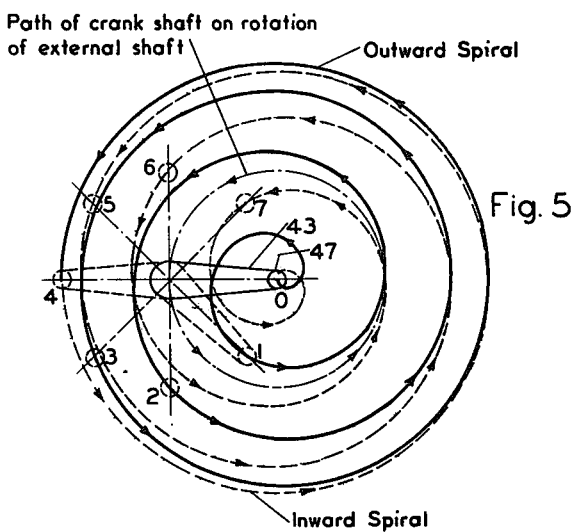
Fig. 5
Walder B. Ashworth,
INVENTOR.

May 5, 1953   W. B. ASHWORTH   2,637,366
SPIRAL DRIVE
Filed July 29, 1947   5 Sheets-Sheet 3
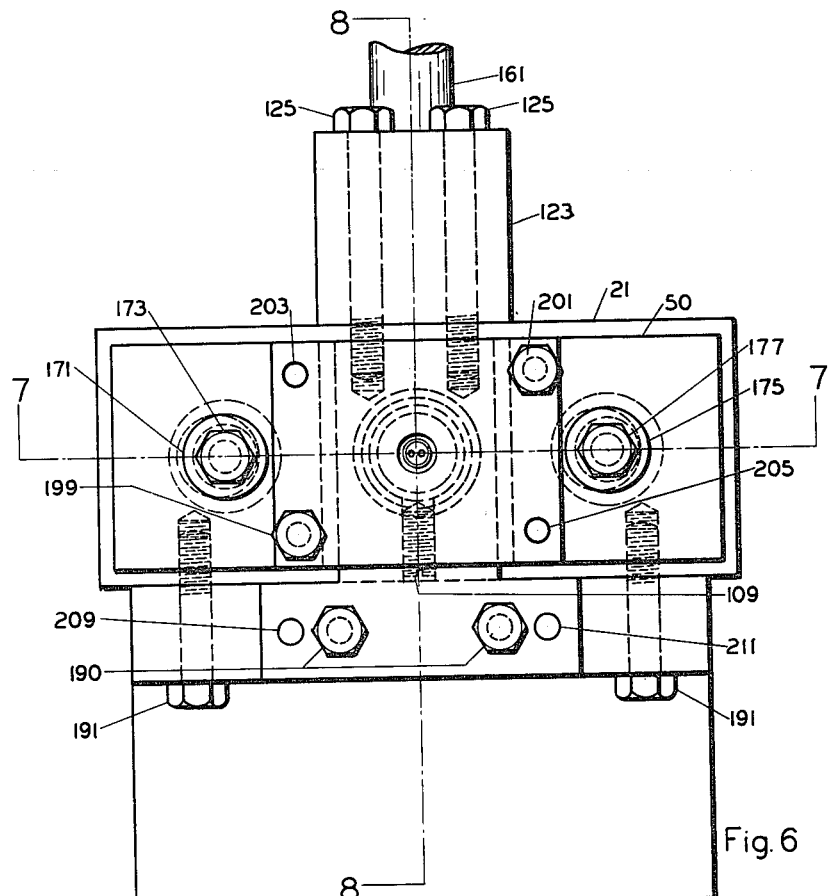
Fig. 6
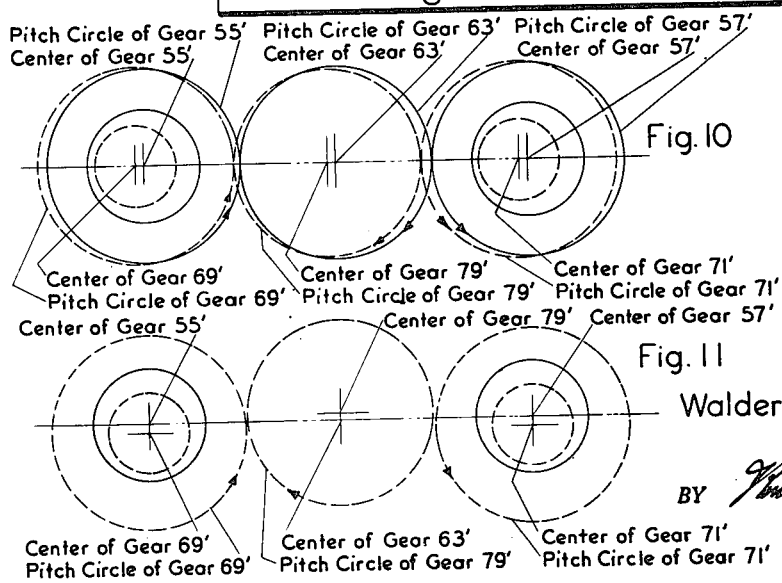
Fig. 10
Fig. 11
Walder B. Ashworth,
INVENTOR.
BY May 5, 1953     W. B. ASHWORTH     2,637,366
SPIRAL DRIVE Filed July 29, 1947     5 Sheets-Sheet 4

Walder B. Ashworth,
INVENTOR.

BY Howson & Howson
Attorneys

Patented May 5, 1953

2,637,366

UNITED STATES PATENT OFFICE 2,637,366

SPIRAL DRIVE

Walder B. Ashworth, West Chester, Pa., assignor to Atlas Powder Company, Wilmington, Del., a corporation of Delaware Application July 29, 1947, Serial No. 764,344

15 Claims. (Cl. 153—73)

The present invention relates to mechanical movements, particularly as applied to crimpers.

An object of the invention is the provision of an improved apparatus for crimping.

Another object of the invention is the provision of an improved apparatus for translating a body in spiral rotary motion.

A further object of the invention is the provision of an improved method for translating a body in spiral rotary motion.

A still further object of the invention is a provision of an improved drive for the type crimper in which the crimping edge is translated in rotary motion against an object to be crimped.

Other objects of the invention will be apparent from the following description and drawing.

In patent application, Serial No. 697,142, filed September 14, 1946, by Daniel D. Huyett for "Crimping Apparatus," now Patent No. 2,541,361 of February 13, 1951, an apparatus is shown by means of which cylindrical shells, such as blasting caps, may be crimped by means of a circular crimping edge which is translated through a spiral or through a succession of circles progressively increasing in radius. By means of the present invention an apparatus and method is provided for driving a crimper of this type so that the crimping edge is translated through a spiral of more than one complete revolution and the apparatus is returned to a non-crimping position with a uni-directional motion of its drive.

According to the present invention a body is translated in a resultant continuous spiral motion by simultaneously translating it at different angular speeds through two circular paths, each of which paths passes through the center of revolution of the other.

The invention also comprises apparatus for performing this method comprising a first means for translating said body in a first circular path; a second means for translating said body in a second circular path, each said circular path passing through the center of revolution of the other, and means operatively connecting said first and second means for operating said first and second means simultaneously so that the angular speeds of translation through said first and second paths differ, thereby causing said body to partake of continuous spiral rotary motion.

The invention will be further described in connection with the drawings which illustrate apparatus for crimping the shells of blasting caps, and in which, Fig. 1 is an elevation, partly in section, of a specific embodiment of an apparatus for performing the invention;

Fig. 2 is a top plan view of the apparatus shown in Fig. 1;

Fig. 3 is a sectional view of a part of the apparatus of Fig. 1 shown in a different portion of its cycle of operation;

Fig. 4 is a top plan view of the portion of apparatus shown in Fig. 3;

Fig. 5 is a diagram showing the shape of the path of movement obtained by the apparatus shown in the preceding figures;

Fig. 6 is a top plan view of a modified crimping apparatus;

Fig. 10 is a diagram showing the position of parts of the apparatus of Fig. 6 at one point of its cycle of operation, and Fig. 11 is a diagram similar to Fig. 10 but showing the position of parts at another point of the cycle of operation.

Figure 1:
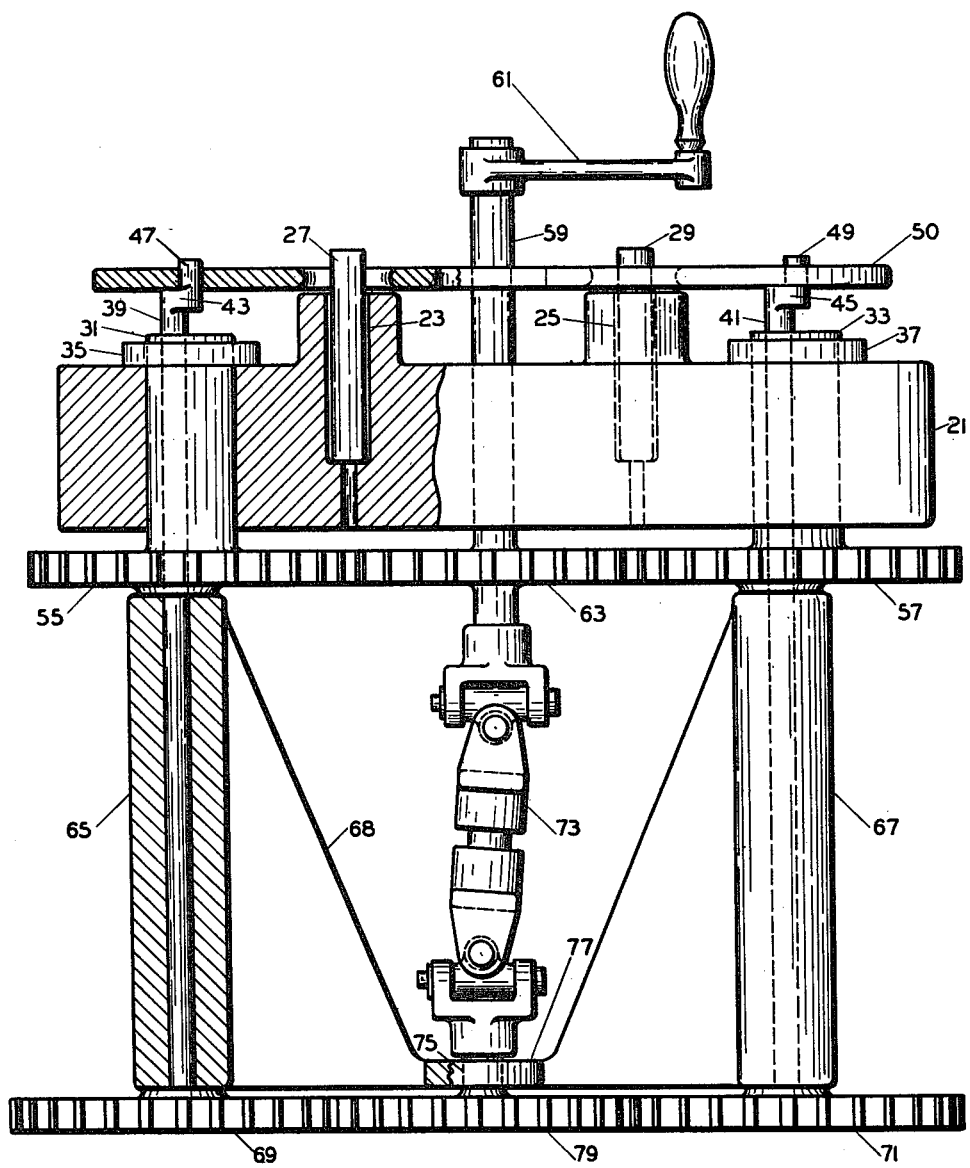

Referring now to Figs. 1 and 2, 21 represents a standard in which are bored holes 23 and 25 for the reception of blasting caps 27 and 29. Through standard 21 are journaled external shafts 31 and 33 which are respectively held in standard 21 by means of thrust rings 35 and 37 affixed to them.

In external shaft 31 is journaled crank shaft 39 offset from the center of external shaft 31, and in external shaft 33 is journaled crank shaft 41 offset from the center of external shaft 33 a distance equal to the distance crank shaft 39 is offset from the center of external shaft 31. Crank shafts 39 and 41 are of the same angular disposition relative to the centers of external shafts 31 and 33 respectively. Crank shafts 39 and 41 are respectively provided with crank arms 43 and 45 of equal length, and attached to crank arms 43 and 45 respectively are crank pins 47 and 49, the centers of which are spaced from the centers of crank shafts 39 and 41 respectively a distance equal to the offset of the centers of crank shafts 39 and 41 from the centers of external shafts 31 and 33. Crank pins 47 and 49 are also of the same angular disposition relative to their respective shafts. In Figs. 1 and 2, crank shafts 39 and 41 are shown positioned at their farthest points of travel to the left permitted by the turning of external shafts 31 and 33, and crank pins 47 and 49 are shown at their farthest points of travel to the right permitted by the rotation of shafts 39 and 41 when shafts 31 and 33 are in the position shown. This places crank pins 47 and 49 directly over the centers of shafts 31 and 33 respectively.

In Figs. 3 and 4, external shaft 31 is shown in a similar position to that in which it is shown in Figs. 1 and 2, but crank shaft 39 is shown turned so that crank pin 47 is at its farthest permitted travel to the left. Crank pin 47 is then removed from the center line of external shaft 31 a distance equal to twice the crank length.

Crank pins 47 and 49 are rotatably mounted in plate 50. Plate 50 contains circular crimping edges 51 and 53 encircling blasting caps 27 and 29 respectively. To external shafts 31 and 33 are respectively keyed similar gears 55 and 57. Through standard 21 is journaled drive shaft 59 actuated by crank 61. Shaft 59 drives gear 63 which is similar to and drives gears 55 and 57. Crank shafts 39 and 41 extend beyond external shafts 31 and 33 respectively, and through bearings 65 and 67 respectively, which bearings are rigidly fixed together by web 68. Crank shafts 39 and 41 below bearings 65 and 67 are respectively keyed to similar gears 69 and 71, each of which is provided with thirty-two teeth. Shaft 59 is drivingly connected to a universal joint, represented generally as 73, and universal joint 73 is drivingly connected to shaft 75 which is journaled in bearing 77 through web 68. Shaft 75 is keyed to gear 79 which is provided with twenty-eight teeth, and which drives gears 69 and 71.

The operation of the apparatus is as follows:

As crank 61 is turned, shaft 59 drives gear 63 which drives gears 55 and 57, which in turn drive external shafts 31 and 33. External shafts 31 and 33 carry crank shafts 39 and 41 respectively through circles having radii equal to the distance that crank shaft 39 is offset from the center of external shaft 31. Shaft 59, in addition to driving gear 63, through universal joint 73 and shaft 75, drives gear 79 which in turn drives gears 69 and 71, which further respectively drive crank shafts 39 and 41. Thus, plate 50 is subjected to the circular translation provided by the rotation of crank shafts 39 and 41 in addition to the circular translation provided by the rotation of external shafts 31 and 33, each circular rotation being of equal radius.

With the relation of parts shown in Figs. 1 and 2, if crank shafts 31 and 39 and their correlative shafts 33 and 41 turned at the same speed in the same direction, the resultant effect on plate 50 would be to hold it stationary because crank pins 47 and 49 would remain directly over the centers of external shafts 31 and 33 respectively. However, if the apparatus were in the relation shown in Figs. 3 and 4, and external shaft 31 and crank shaft 39 turned at the same speed in the same direction, plate 50 would be translated in a resultant circular motion, the radius of which would equal twice the length of crank arm 43. Or to put it another way and regarding the movement only of external shaft 31, crank shaft 39 and the parts immediately connected therewith (external shaft 33, crank shaft 41 and connected parts always being in the same relative positions as are external shaft 31, crank shaft 39 and connected parts), if shaft 31 and crank shaft 39 moved at the same speed, plate 50 would be translated in circular motion, the radius of which would depend upon, and in any particular case be equal to, the distance the center of crank pin 47 was spaced from the center of external shaft 31.

Thus, if crank pin 47 is made to move gradually away from the center line of external shaft 31, as external shaft 31 turns, plate 50 is translated in a resultant continuous spiral motion of increasing radius. Since gear 55 has less teeth than does gear 69, crank shaft 39 moves at less angular speed than does external shaft 31. This lag of crank shaft 39 means that for one revolution of external shaft 31, crank shaft 39 completes less than a revolution. Consequently, as the apparatus is driven, crank pin 47 gradually and continuously moves out from the center of external shaft 31 until it reaches twice the crank length (as shown in Figs. 3 and 4), and then gradually and continuously moves back to coincide with center line of external shaft 31 when it has resumed its original position. The resultant motion of crank pin 47 is a spiral proceeding outward from its center for more than one complete revolution and returning inwardly to its original position.

Crank pin 49 takes an exactly similar motion to that of crank pin 47 and, consequently, plate 50 is translated so that it moves in this same motion. As plate 50 is translated, every point in plate 50 is similarly translated and so are crimping circles 51 and 53. Thus from the position shown in Fig. 1, crimping circles 51 and 53 respectively gradually and continuously spiral toward and into caps 27 and 29 producing the desired crimps, and then crimping circles 51 and 53 gradually and continuously spiral away from caps 27 and 29 to starting position, when crimped caps 27 and 29 may be withdrawn and further caps may be inserted and similarly crimped.

In Fig. 5 is shown a much enlarged diagram of the path taken by crank pin 47 (also taken by crank pin 49, and every point in plate 50). At the start, crank pin 47 and crank arm 43 are at the position shown by full lines and labeled 0. Since gear 79 which has twenty-eight teeth, is driven at the same speed as gear 63 (and hence at the same speed as gear 55 driving external shaft 31), and drives gear 69 having thirty-two teeth, crank shaft 39 rotates twenty-eight times for each thirty-two turns of external shaft 31, or crank shaft 39 rotates at ⅞ the speed of external shaft 31. Referring again to Fig. 5, the position of the crank pin at position 0 is that shown in Fig. 1. As external shaft 31 and crank shaft 39 turn, crank pin 47 follows the heavy outward, continuous spiral line shown until, after the external shaft has made one complete revolution, the crank arm and crank pin are at the position shown in dotted lines and labeled position 1, that is, ⅛ less than a complete turn around their crank shaft. After two complete turns of external shaft 31, crank pin 47 has followed the outward spiral further to reach position 2, a further ⅞ of a revolution around its crank shaft. Similarly, after three revolutions of external shaft 31, crank pin 47 has followed the spiral further to position 3, and after four revolutions of external shaft 31, crank pin 47 has reached at position 4 its full range from position 0. It then starts to spiral inwardly back, and on continued operation of the apparatus crank pin 47 follows the inward, continuous spiral shown by dotted lines, reaching, after five, six, and seven revolutions of external shaft 31, positions 5, 6, and 7 respectively on the diagram. Finally after external shaft 31 has completed eight revolutions, crank pin 47, having completed seven revolutions, is again at 0 position, and the cycle has been completed. A spiral taking eight turns to go in and out is similarly obtained if the crank shaft leads rather than lags the external shaft, so that the ratio of the number of teeth (and hence angular speed) on gears 79 and 69 is 9 to 8 rather than 7 to 8.

Depending upon the ratio of the angular speeds of the crank shafts and the external shafts carrying them, different path configurations are taken by the crank pins and hence by the crimper plate. For example, if the crank shafts take one turn for every two turns of the external shafts, the cycle is completed in two turns of the external shafts. If the ratio of the rate of angular speeds of the crank shafts to the external shafts is 5 to 8, the cycle is completed in 2.67 revolutions of the external shafts. However, in this case when the in-and-out spiral is completed, the external shafts are not at the same relative angular position as when they started, and it takes three complete cycles before the apparatus has returned to just the same position as when it started. Each of the three spirals so produced lies in a different geometrical position.

The number of turns of the external shafts required to make a complete in-and-out cycle of the crank pins, may be determined by the formula $$\frac{1}{R-1}$$

where R is the ratio of the speed of the crank shafts to the speed of the external shafts. Thus, when the crank shafts turn seven times for every eight turns for the external shafts, the ratio, R, is 7/8 and the value of $$\frac{1}{R-1}$$

is minus 8. (The sign of the result is immaterial to the determination of the number of turns.) Inspection of Fig. 5 also shows that in eight turns of the external shaft the in-and-out cycle has been completed.

If the crank shafts and external shafts are rotated at different speeds and in different directions, the spirals obtained are very steep and the in-and-out cycle is always completed in less than one revolution of the external shaft. Thus, if the crank shafts rotate once clockwise for each two rotations counterclockwise of the external shafts, one cycle is completed in 2/3 of a revolution $$\left(\frac{1}{R-1}=\frac{1}{-\frac{1}{2}-1}=\frac{1}{-3/2}=-2/3\right)$$

and if three cycles are carried through, a symmetrical trefoil path is followed.

While the mechanical movement effected by the present invention is useful for translating bodies in different paths depending upon the ratio and direction of the movements of the crank shafts and the external shafts, to obtain desirable crimping action on objects of circular cross section it is desirable that the movement obtained be a continuous spiral which takes several complete turns before reaching its fullest diameter. Thus, for a crimping operation it would seldom be desirable to employ a continuous spiral motion which is completed in less than eight turns of the external shafts, and usually it will be preferred to employ continuous spirals which are completed in from about 14 to about 25 turns when, for example, ordinary blasting caps are to be crimped.

Figure 7:
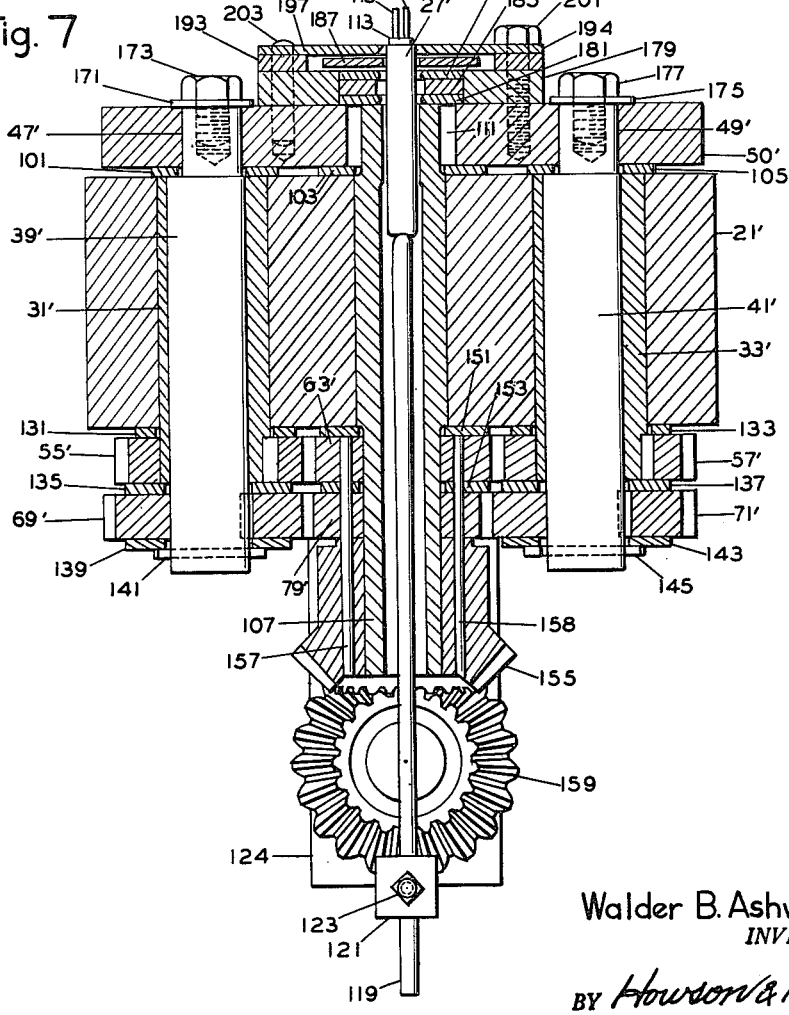
Fig. 7 is a front sectional view of the apparatus shown in Fig. 6 taken along line 7—7 of Fig. 6.
Figure 8:
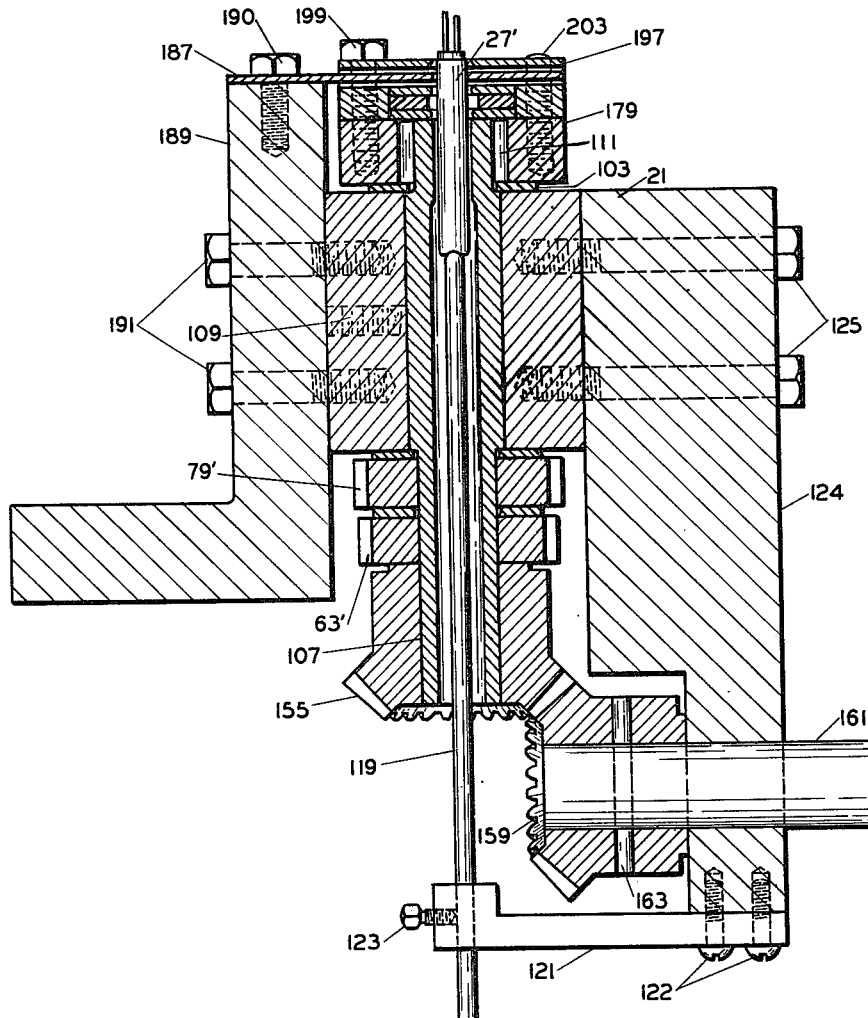
Fig. 8 is a side sectional view of the apparatus shown in Fig. 6 taken along line 8—8 of Fig. 6.

Figs. 6, 7, and 8 of the drawings, while not exactly to scale, are approximately full-size views of a blasting cap crimper made in accordance with the present invention. Parts in this crimper which are directly analogous to parts of the crimper shown in Figs. 1 and 2 are designated by primed numbers corresponding to those used there previously. Thus, the crimper contains a standard 21' through which are journaled external shafts 31' and 33'. Through external shafts 31' and 33' are journaled crank shafts 39' and 41'. The centers of crank shafts 39' and 41' are respectively offset 0.030 inch from the centers of external shafts 31' and 33'. Machined as a part of external shaft 31' is crank pin 47' the center of which is offset 0.030 inch from the center of crank shaft 39'. Since the crank length here involved is so short, it is unnecessary to provide a specific crank arm, the offsetting of the crank pin 47' on crank shaft 39' being sufficient to provide the desired crank length. Crank pin 49' is affixed to crank shaft 41' in the same way that crank pin 47' is affixed to crank shaft 39' and is offset the same distance. External shafts 31' and 33' carry crank shafts 39' and 41' at the same angular disposition, and crank pins 47' and 49' are carried by crank shafts 39' and 41' at the same angular disposition. Thus, as is shown in Fig. 7, crank shafts 39' and 41' are at their farthest leftward movement and crank pins 47' and 49' are disposed so that their center lines coincide with the center lines of shafts 31' and 33' respectively. Crank pins 47' and 49' are rotatably mounted in plate 50'. Plate 50' is separated from standard 21' and shafts 31' and 33' by means of washers 101, 103 and 105.

Through the center of standard 21' and through hole 111 in plate 50' passes tubular element 107 which is rigidly fastened in standard 21' by set screw 109. Hole 111 is large enough to permit plate 50' its full movement without its impinging on tubular element 107. The top portion of tubular element 107 has an internal diameter sufficient to hold electric blasting cap 27' 0.277 inch in diameter, into which plug 113 containing leg wires 115 and 117 is to be crimped. Blasting cap 27' is supported at its base by means of rod 119 extending up inside of tubular element 107. Rod 119 is supported in bracket 121 by set screw 123. Bracket 121 is secured to another bracket 124 by means of screws 122. Bracket 124 is secured to standard 21' by screws 125. Gears 55' and 57' having thirty teeth each are keyed to external shafts 31' and 33' respectively and separated from standard 21' by washers 131 and 133 respectively. Gears 69' and 71' each having thirty-one teeth are respectively keyed to crank shafts 39' and 41' respectively, and are separated from gears 55' and 57' by washers 135 and 137 respectively, which washers 135 and 137 also support external shafts 31' and 33' respectively. Washer 131, gear 55', washer 135, and gear 69' are supported by washer 139 which in turn is supported by pin 141 passing through crank shaft 39'. Washer 133, gear 57', washer 137, and gear 71' are supported by washer 143, which in turn is supported by pin 145 passing through crank shaft 41'. Gears 55' and 57' are driven by gear 63' also having thirty teeth, which idles on tubular element 107 and is separated from standard 21' by means of washer 151. Gears 69' and 71' are driven by gear 79' having twenty-nine teeth, which also idles on tubular element 107, and is separated from gear 63' by washer 153. Below gear 79' lies bevel gear 155, which also idles on tubular element 107 and which is fastened to gears 63' and 79' by means of pins 157 and 158. Thus, bevel gear 155 drives both gears 63' and 79'. It is to be noted that gear 79' rotates eccentrically around tubular element 107. Bevel gear 155 is driven by bevel gear 159 which is keyed to shaft 161 by means of pin 163. Shaft 161 is journaled in bracket 124. Shaft 161 is the driving shaft for the apparatus.

Crank pin 47' and the parts connecting it are prevented from downward movement by washer 171 and bolt 173, and similarly crank pin 49' and the parts connected to it are prevented from downward movement by washer 175 and bolt 177.

The device shown in Figs. 6 through 9 is equipped to provide two crimps in the body of cap 27', and in addition one crimp to turn over the top of the shell. Ring 179, which is externally rectangular, is placed on top of plate 50', and in the center of ring 179 are placed circular crimping plates 181 and 183, each 0.312 inch in inside diameter, which are spaced apart by means of ring spacer 185, the combined thickness of which members is equal to the thickness of ring 179. Above ring 179 is located support plate 187 encircling and supporting cap 27' and rigidly fixed to bracket 189 by bolts 190. Bracket 189 is bolted to standard 21' by means of bolt 191. Bracket 189 may be affixed to a table (not shown) to support the entire apparatus. Above ring 179 are placed strips 193 and 194, and over them is placed top crimping plate 197, 0.295 inch in inside diameter. Ring 179, strip 193, and plate 197 are all bolted to plate 50' by means of bolt 199, and ring 179. Strip 194 and plate 197 are bolted to plate 50' by means of bolt 201. Sufficient clearance is provided between strips 193 and 194, and fixed support plate 197 to permit strips 193 and 194 to move with plate 50'. Plate 197, the crimping plates 181 and 183, and spacer ring 185 are all readily removed for replacement, and to permit their easy assembly dowel pins 203 and 205 are embedded in plate 50'. Similarly dowel pins 209 and 211 (Fig. 6) are provided for the positioning of holder plate 187.

In the operation of the apparatus, drive shaft 161 is turned by a source of power (not shown). Drive shaft 161 carries bevel gear 159 which drives bevel gear 155 rigidly connected to gears 63' and 79'.

Gear 63' drives gears 55' and 57' which in turn respectively drive external shafts 31' and 33'. In turning, external shafts 31' and 33' translate crank shafts 39' and 41' respectively. Gear 79' drives gears 69' and 71' which respectively turn crank shafts 39' and 41'. The superimposed rotations of crank shafts 39' and 41' and external shafts 31' and 33' acting through crank pins 47' and 49', translate plate 50' in outward, continuous spiral motion. Crimping plates 181, 183, and 197 are carried by plate 50', which spirals into cap shell 27' producing the desired crimps. Plate 187 remains stationary to provide support for the top of cap shell 27' during the crimping operation. As the operation of the apparatus is continued, plate 50' and the crimping plates spiral inwardly and away from cap shell 27' until they again reach the position shown in Figs. 6, 7, and 8, and the crimped cap is withdrawn.

Figure 9:
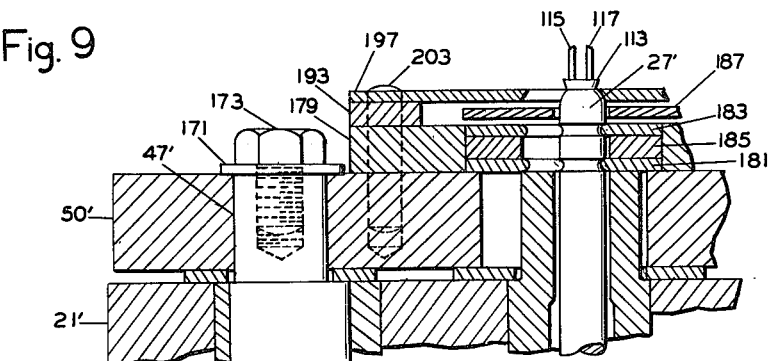
Fig. 9 is an enlarged view of the apparatus of Fig. 7 shown at a different point in its cycle of operation.

Since gears 55', 57', and 63' have the same number of teeth; since gear 79' has twenty-nine teeth; and since gears 69' and 71' each have thirty-one teeth, the ratio of the speeds of rotation of crank shafts 47' and 49' to external shafts 31' and 41' is 29 to 31 and a complete inward and outward spiral takes $$\left(\frac{1}{\frac{29}{31}-1}\right)$$

or 15½ revolutions of the external shafts 31' and 33', and when the device has made one inward and outward spiral, the parts are in a position which would appear as a mirror image of Fig. 7. However, after two cycles, or two complete crimping operations, the parts are again in position as shown in Fig. 7. Fig. 9 shows an arrangement of the parts while the crimping edges are being pressed into the cap shell.

It is to be noted that in the device shown in Figs. 6, 7, and 8, gears 63' and 79' are rigidly connected together, while in the device shown in Figs. 1 and 2, analogous gears 63 and 79 are connected by a universal joint. The universal joint is employed to insure that gear 79 is always in mesh with gears 69 and 71. In the device shown in Figs. 6, 7, and 8, gear 79' tends to move in a direction which would take it out of mesh with gears 69' and 71'. This action is illustrated by Figs. 10 and 11 which show the pitch circles and centers of these gears. With the apparatus, in the position shown in Fig. 7, the centers of all gears are in line as appears in Fig. 10. After ¼ revolution of gear 63' (and gear 79'), as is shown in Fig. 11, the center of gear 79' has moved up, whereas the centers of gears 69' and 71' have moved down. In the positions shown in Fig. 11, the distance between centers of gears 69' and 79' (and between the centers of gears 79' and 71') is greater than it is in the positions shown in Fig. 10. However, in the device shown in Fig. 7, the amount of eccentricity is so small that the gears never actually come out of mesh and their tendency in that direction is of no practical importance. In a device in which larger eccentricities are involved, means for keeping the gears in mesh should be provided, as, for example, the universal joint taught in Fig. 1. This effect could also be accomplished by placing idler gears between gears 55' and 63', between gears 63' and 57', between gears 69' and 79', and between gears 79' and 71'. The idlers, by making driving and driven gears rotate in the same direction, would prevent their separation.

In the device shown in Figures 6 through 9, there is some lost motion between the start of the crimping cycle and the point of contact of the crimping edges with the cap shell. If a deeper crimp is desired, the crimping edges may be made smaller, in which case there will be less lost motion. Or if it is desired to utilize more of the cycle of operation in actual crimping without making a deeper crimp, this may be accomplished by building the device with smaller crimping edges, with less offset between the external and internal shafts, and with less crank length.

It may be seen that by means of the present invention a method is provided for translating a body, and particularly a body containing crimping edges, in reversing spiral motion with a unidirectional drive, and that the objects of the invention have been achieved. Other modifications of the invention will be apparent to those skilled in the art.

What is claimed is:

1. An apparatus for translating a body in continuous spiral rotary motion comprising a first means for translating said body in a first circular path; a second means for translating said body in a second circular path, each said circular path passing through the center of revolution of the other; means operatively connecting said first and second means and operative to effect continuous and simultaneous operation of said first and second means at different angular speeds of translation through said first and second paths to cause said body to partake of continuous spiral rotary motion; and means for preventing axial rotation of said body.

2. An apparatus according to claim 1 in which said second means is for translating said body in the same angular direction as said first means.

3. An apparatus for translating a body in spiral rotary motion comprising two spaced cranks of equal crank length and of similar angular disposition rotatably mounted in said body, means for synchronously turning said cranks in the same direction, means for synchronously translating each of said cranks in the same direction and at a similar angular disposition through a separate circular path having a radius equal to the crank length, said last mentioned means being constructed and adapted to translate said cranks at an angular speed different from that at which said cranks turn.

4. An apparatus according to claim 3 in which said cranks are translated in the same angular direction as that in which said cranks turn.

5. An apparatus according to claim 4 in which the ratio, R, of the speed of rotation of said cranks and the speed of translation of said cranks is such that the quantity $$\frac{1}{R-1}$$

is numerically at least about eight.

6. An apparatus according to claim 5 in which the quantity $$\frac{1}{R-1}$$

is numerically at least about 14 and not more than about 25.

7. An apparatus for translating a body in spiral rotary motion comprising a body, a first pin rotatably mounted in said body, a first shaft affixed to said first pin with its center line offset from the center line of said first pin, a second pin rotatably mounted in said body at a point spaced from said first pin, a second shaft affixed to said second pin with its center line offset from the center line of said second pin a distance equal to and of similar angular disposition to the offset of the center line of said first shaft from the center line of said first pin, means for rotating said first shaft and means for rotating said second shaft at the same angular velocity; a third shaft, said first shaft journaled longitudinally through said third shaft, the center line of said first shaft being offset from the center line of said third shaft a distance equal to the offset of the center line of said first shaft from the center line of said first pin; a fourth shaft, said second shaft journaled longitudinally through said fourth shaft, the center line of said second shaft being offset from the center line of said fourth shaft a distance equal to and of similar angular disposition to the offset of the center line of said first shaft from the center line of said first shaft from the center line of said third shaft; means rotatably mounting said third and fourth shafts in fixed relationship and means for turning said third and fourth shafts at the same angular speed but at a different angular speed than that at which the first and second shafts turn.

8. An apparatus for translating a body in spiral rotary motion comprising a body, a first pin rotatably mounted in said body, a first shaft affixed to said first pin with its center line offset from the center line of said first pin, a second pin rotatably mounted in said body at a point spaced from said first pin, a second shaft affixed to said second pin with its center line offset from the center line of said second pin a distance equal to and of similar angular disposition to the offset of the center line of said first shaft from the center line of said first pin, means for rotating said first shaft and means for rotating said second shaft at the same angular velocity; a third shaft, said first shaft journaled longitudinally through said third shaft, the center line of said first shaft being offset from the center line of said third shaft a distance equal to the offset of the center line of said first shaft from the center line of said first pin; a fourth shaft, said second shaft journaled longitudinally through said fourth shaft, the center line of said second shaft being offset from the center line of said fourth shaft a distance equal to and of similar angular disposition to the offset of the center line of said first shaft from the center line of said third shaft; means rotatably mounting said third and fourth shafts in fixed relationship, and means for turning said third and fourth shafts at the same angular speed and in the same direction of rotation that said first and second shafts turn, and means relating the angular speed at which said first and second shafts turn to the angular speed at which said third and fourth shafts turn so that said third and fourth shafts turn at a different angular speed than do said first and second shafts.

9. An apparatus according to claim 8 wherein the ratio, R, of the speed at which said first and second shafts turn to the speed at which said third and fourth shafts turn is such that the value of $$\frac{1}{R-1}$$

is numerically at least about eight.

10. An apparatus according to claim 9 in which the ratio, R, is such that the value of $$\frac{1}{R-1}$$

is numerically at least about 14 and not more than about 25.

11. An apparatus for crimping comprising a body containing a circular crimping edge, a first pin rotatably mounted in said body; a first shaft affixed to said first pin with its center line offset from the center line of said first pin, a second pin rotatably mounted in said body at a point spaced from said first pin, a second shaft affixed to said second pin with its center line offset from the center line of said second pin a distance equal to and of similar angular disposition to the offset of the center line of said first shaft from the center line of said first pin, means for rotating said first shaft and means for rotating said second shaft at the same angular velocity; a third shaft, said first shaft journaled longitudinally through said third shaft, the center line of said first shaft being offset from the center line of said third shaft a distance equal to the offset of the center line of said first shaft from the center line of said first pin; a fourth shaft, said second shaft journaled longitudinally through said fourth shaft, the center line of said second shaft being offset from the center line of said fourth shaft a distance equal to and of similar angular disposition to the offset of the center line of said first shaft from the center line of said third shaft; means rotatably mounting said third and fourth shafts in fixed relationship, and means for turning said third and fourth shafts at the same angular speed but at a different angular speed than that at which the first and second shafts turn.

12. An apparatus for translating a body in spiral rotary motion comprising a body, a first pin rotatably mounted in said body, a first shaft affixed to said first pin with its center line offset from the center line of said first pin, a second pin rotatably mounted in said body at a point spaced from said first pin, a second shaft affixed to said second pin with its center line offset from the center line of said second pin a distance equal to and of similar angular disposition to the offset of the center line of said first shaft from the center line of said first pin, a third shaft, said first shaft journaled longitudinally through said third shaft, the center line of said first shaft being offset from the center line of said third shaft a distance equal to the offset of the center line of said first shaft from the center line of said first pin; a fourth shaft, said second shaft journaled longitudinally through said fourth shaft, the center line of said second shaft being offset from the center line of said fourth shaft a distance equal to and of similar angular disposition to the offset of the center line of said first shaft from the center line of said third shaft; means rotatably mounting said third and fourth shafts in fixed relationship, and means for driving said shafts comprising a first gear and a second gear of equal size fixed to said first shaft and said second shaft, respectively, a third gear and a fourth gear of equal size fixed to said third shaft and said fourth shaft, respectively, said third and fourth gears differing slightly in diameter from said first and second gears, a fifth gear drivingly connected to said first and second gears, a sixth gear constructed to rotate at the same angular speed as said fifth gear and drivingly connected to said third and fourth gears, and means for driving one of said gears.

13. An apparatus for crimping comprising a body containing a circular crimping edge, a first pin rotatably mounted in said body, a first shaft affixed to said first pin with its center line offset from the center line of said first pin, a second pin rotatably mounted in said body at a point spaced from said first pin, a second shaft affixed to said second pin with its center line offset from the center line of said second pin a distance equal to and of similar angular disposition to the offset of the center line of said first shaft from the center line of said first pin, a third shaft, said first shaft journaled longitudinally through said third shaft, the center line of said first shaft being offset from the center line of said third shaft a distance equal to the offset of the center line of said first shaft from the center line of said first pin; a fourth shaft, said second shaft journaled longitudinally through said fourth shaft, the center line of said second shaft being offset from the center line of said fourth shaft a distance equal to and of similar angular disposition to the offset of the center line of said first shaft from the center line of said third shaft; means rotatably mounting said third and fourth shafts in fixed relationship, and means for driving said shaft comprising a first gear and a second gear of equal size fixed to said first shaft and said second shaft, respectively, a third gear and a fourth gear of equal size fixed to said third shaft and said fourth shaft, respectively, said third and fourth gears differing slightly in diameter from said first and second gears, a fifth gear drivingly connected to said first and second gears, a sixth gear constructed to rotate at the same angular speed as said fifth gear and drivingly connected to said third and fourth gears, and means for driving one of said gears.

14. The method of effecting a circular forming operation on a workpiece in which a body having a work-engaging surface is translated through a continuous spiral path of more than one complete revolution and without turning about its own axis, which comprises holding the body against axial rotation about its own axis; continuously translating a member mounted in said body in a circular path about a first axis; and simultaneously and continuously translating said first axis in a circular path at a different angular velocity about a fixed second axis, said circular paths each passing through the center of rotation of the other.

15. The method of effecting a circular forming operation on a workpiece in which a body having a work-engaging surface is translated through a continuous spiral path of more than one complete revolution and without turning about its own axis, which comprises holding the body against axial relation about its own axis; continuously translating a member mounted in said body in a circular path about a first axis; and simultaneously and continuously translating said first axis in a circular path at a different angular velocity and in the same angular direction about a fixed second axis, said circular paths each passing through the center of rotation of the other, the ratio, R, of the angular velocities being such that the quantity $$\frac{1}{R-1}$$

is numerically at least about 8.

WALDER B. ASHWORTH.

References Cited in the file of this patent

UNITED STATES PATENTS

| Number | Name | Date |
|---|---|---|
| 220,111 | Baker | Sept. 30, 1879 |
| 1,738,161 | Walker | Dec. 3, 1929 |
| 1,740,792 | Strachauer et al. | Dec. 24, 1929 |
| 1,952,239 | Dreyer | Mar. 27, 1934 |
| 2,125,269 | Buff | Aug. 2, 1938 |
| 2,215,731 | Williams et al. | Sept. 24, 1940 |